US011249872B1

(12) United States Patent
Thangavel et al.

(10) Patent No.: US 11,249,872 B1
(45) Date of Patent: Feb. 15, 2022

(54) GOVERNOR CIRCUIT FOR SYSTEM-ON-CHIP

(71) Applicant: Xilinx, Inc., San Jose, CA (US)

(72) Inventors: Karthikeyan Thangavel, Tamilnadu (IN); K. Nithin Kumar, Bangalore (IN); Yashwant Dagar, District-Mahendergarh (IN); Dinakar Medavaram, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/913,053

(22) Filed: Jun. 26, 2020

(51) Int. Cl.
*G06F 11/00* (2006.01)
*G06F 11/22* (2006.01)
*G06F 11/36* (2006.01)
*G06F 11/30* (2006.01)
*G06F 11/34* (2006.01)

(52) U.S. Cl.
CPC ...... *G06F 11/2221* (2013.01); *G06F 11/3051* (2013.01); *G06F 11/3409* (2013.01); *G06F 11/3648* (2013.01)

(58) Field of Classification Search
CPC .......................... G06F 11/3051; G06F 11/3409
See application file for complete search history.

(56) References Cited

U.S. PATENT DOCUMENTS

| | | | | |
|---|---|---|---|---|
| 5,568,608 A | * | 10/1996 | Shannon | G11B 19/02 714/44 |
| 5,805,791 A | * | 9/1998 | Grossman | G06F 11/142 714/23 |
| 5,815,647 A | * | 9/1998 | Buckland | G06F 11/0745 714/3 |
| 5,995,744 A | | 11/1999 | Guccione | |
| 6,212,650 B1 | | 4/2001 | Guccione | |
| 6,269,478 B1 | * | 7/2001 | Lautenbach-Lampe | G06F 11/0757 714/15 |
| 6,711,702 B1 | * | 3/2004 | Oberhauser | G06F 11/076 714/47.2 |
| 6,985,980 B1 | | 1/2006 | Allegrucci | |
| 7,308,564 B1 | | 12/2007 | Jenkins, IV | |
| 7,373,558 B2 | * | 5/2008 | Mukherjee | G06F 11/0715 714/48 |
| 7,644,052 B1 | * | 1/2010 | Chang | G06N 5/022 706/45 |
| 7,805,593 B1 | | 9/2010 | Donlin | |
| 8,019,716 B2 | * | 9/2011 | Griffith | G06N 5/02 706/59 |
| 8,327,200 B1 | | 12/2012 | Mohan | |

(Continued)

*Primary Examiner* — Loan L. T. Truong
(74) *Attorney, Agent, or Firm* — Kevin T. Cuenot

(57) ABSTRACT

An integrated circuit can include a processor configured to execute program code and a plurality of peripheral circuit blocks coupled to the processor. The plurality of peripheral circuit blocks are controlled by the processor as a master. The integrated circuit also can include a governor circuit coupled to the plurality of peripheral circuit blocks. The governor circuit is configured to monitor operation of the plurality of peripheral circuit blocks for known error states and, in response to detecting an occurrence of a selected known error state of the known error states in a selected peripheral circuit block of the plurality of peripheral circuit blocks, perform a predetermined action on the selected peripheral circuit block.

20 Claims, 6 Drawing Sheets

(56) References Cited

U.S. PATENT DOCUMENTS

| | | | | |
|---|---|---|---|---|
| 8,510,592 B1* | 8/2013 | Chan | G06F 11/0751 |
| | | | 714/5.1 |
| 8,595,555 B1 | 11/2013 | Taylor | |
| 8,595,561 B1 | 11/2013 | Lu et al. | |
| 8,886,995 B1* | 11/2014 | Pallapothu | G06F 11/1405 |
| | | | 714/15 |
| 9,086,965 B2* | 7/2015 | Adar | G06F 11/0793 |
| 9,411,667 B2* | 8/2016 | Jayakumar | G06F 11/0712 |
| 10,067,854 B2 | 9/2018 | Villarreal et al. | |
| 10,110,234 B1 | 10/2018 | Durairajan et al. | |
| 10,161,999 B1 | 12/2018 | Nand et al. | |
| 10,235,272 B2 | 3/2019 | Villarreal et al. | |
| 10,402,252 B1* | 9/2019 | Habusha | G06F 11/3006 |
| 2002/0062459 A1* | 5/2002 | Lasserre | G06F 11/0715 |
| | | | 714/10 |
| 2002/0065962 A1* | 5/2002 | Bakke | G06F 13/385 |
| | | | 710/38 |
| 2002/0092002 A1* | 7/2002 | Babaian | G06F 9/45504 |
| | | | 717/137 |
| 2004/0003160 A1* | 1/2004 | Lee | G06F 11/0745 |
| | | | 710/305 |
| 2004/0230861 A1* | 11/2004 | Bailey | G06F 11/0712 |
| | | | 714/6.12 |
| 2006/0101424 A1* | 5/2006 | Griffith | G06F 8/51 |
| | | | 717/136 |
| 2007/0088874 A1* | 4/2007 | Brabant | G06F 13/387 |
| | | | 710/62 |
| 2008/0201609 A1* | 8/2008 | Lu | G06F 11/2221 |
| | | | 714/27 |
| 2011/0238962 A1* | 9/2011 | Cain, III | G06F 9/384 |
| | | | 712/228 |
| 2012/0036400 A1* | 2/2012 | Miller | G06F 11/10 |
| | | | 714/54 |
| 2012/0137093 A1* | 5/2012 | Ferrario | G06F 11/1441 |
| | | | 711/162 |
| 2013/0132700 A1* | 5/2013 | Liu | G06F 12/00 |
| | | | 711/170 |
| 2013/0145055 A1* | 6/2013 | Kegel | G06F 12/0223 |
| | | | 710/26 |
| 2014/0089531 A1* | 3/2014 | Bhogal | G06F 11/3013 |
| | | | 710/8 |
| 2014/0258564 A1* | 9/2014 | Ganesh | G06F 13/10 |
| | | | 710/16 |
| 2014/0289710 A1* | 9/2014 | Goto | G06F 11/3636 |
| | | | 717/128 |
| 2016/0306691 A1* | 10/2016 | Aneja | G06F 11/0751 |
| 2016/0335149 A1* | 11/2016 | David | G06F 11/0757 |
| 2019/0163655 A1* | 5/2019 | Yamaguchi | G06F 11/0757 |
| 2021/0124655 A1* | 4/2021 | Birnie | G06F 11/1441 |

\* cited by examiner

| Peripheral Circuit Block | Task | Address Offset | Control Register(s) to Monitor | Known Error State (Trigger Value) | Control Register(s) to Modify for Recovery | Recovery State Information | Mask |
|---|---|---|---|---|---|---|---|
| QSPI | G | 0xf0f00000 | 0x000104 | (RD value & 0x800) | 0x00010C | 0x800 | 0x00007FF |
| USB | G | 0xE200000 | 0x420 | (RD Value & 0x20002) | 0x420 | 0x10 | 0xFFFF_FF7F |
| DDR QoS | G | 0xFD0B0110 | 0x110 | (RD Value > EXPECTED) | 0xFD360008 | 0x0 | 0x0 |
| DDR | M | 0xD090000 | 0x204 | (RD Value & 0x4) | - | - | - |
| CCI | M | 0xD5E0000 | 0x10 | (RD Value & 0x10000001) | - | - | - |
| NAND | M | 0xF100000 | 0x38 | !0x0 | - | - | - |
| | | | 0x40 | !0x0 | - | - | - |
| | | | 0x44 | !0x0 | - | - | - |
| USB | D | 0xF5E0000 | 0x0060 0x0064 | - | - | - | - |
| | | 0xE20C000 | 0x024 0x704 0x708 0x70C 0x438 | - | - | - | - |

600

| |
|---|
| Read, using a governor circuit, current states of a plurality of peripheral circuit blocks of an integrated circuit, wherein the plurality of peripheral circuit blocks are coupled to a processor in the integrated circuit configured to execute program code
602 |

| |
|---|
| Detect, using the governor circuit, a selected known error state in a selected peripheral circuit block of the plurality of peripheral circuit blocks by comparing the current states with a list of known error states for the plurality of peripheral circuit blocks
604 |

| |
|---|
| In response to detecting the selected known error state, performing, using the governor circuit, a corrective action by writing recovery state information to the selected peripheral circuit block.
606 |

FIG. 6

GOVERNOR CIRCUIT FOR SYSTEM-ON-CHIP

TECHNICAL FIELD

This disclosure relates to integrated circuits (ICs) and, more particularly, to a circuit implemented on an IC that is capable of monitoring and recovering other circuit resources of the IC.

BACKGROUND

A "System-on-Chip" or "SoC" is a type of integrated circuit (IC). An SoC may be provided as a single package whether formed of a single, monolithic die or a plurality of interconnected dies. A typical SoC includes one or more processors capable of executing program code and one or more other circuits. The other circuits are coupled to, and operate cooperatively with, the processor(s). Examples of the other circuits include, but are not limited to, peripheral devices such as interfaces and memory controllers. In some cases, the SoC may include programmable logic that is coupled to the processor and/or the other circuits.

SUMMARY

In one aspect, an integrated circuit can include a processor configured to execute program code and a plurality of peripheral circuit blocks coupled to the processor. The plurality of peripheral circuit blocks are controlled by the processor as a master. The IC also can include a governor circuit coupled to the plurality of peripheral circuit blocks. The governor circuit is configured to monitor operation of the plurality of peripheral circuit blocks for known error states and, in response to detecting an occurrence of a selected known error state of the known error states in a selected peripheral circuit block of the plurality of peripheral circuit blocks, perform a predetermined action on the selected peripheral circuit block.

In another aspect, a governor circuit implemented within an IC can include a task table defining a plurality of peripheral circuit blocks of the IC, known error states for the plurality of peripheral circuit blocks, and corrective actions to be performed in response to detecting one or more of the known error states. The governor circuit can include a transaction circuit configured to read operating state information from the plurality of peripheral circuit blocks and write recovery state information to the plurality of peripheral circuit blocks. The governor circuit can include a monitor circuit and a correction and log circuit. The monitor circuit can be configured to detect the known error states in the plurality of peripheral circuit blocks based on the operating state information. The correction and log circuit can be configured to determine, using the task table, corrective actions to be performed responsive to detection of the known error states. The governor circuit also can include a controller configured to control operation of the transaction circuit, the monitor circuit, and the correction and log circuit. The transaction circuit can be configured to perform a selected corrective action by writing to a selected peripheral circuit block of the plurality of peripheral circuit blocks in response to detecting a selected known error state in the selected peripheral circuit block.

In another aspect, a method includes reading, using a governor circuit, operating state information of a plurality of peripheral circuit blocks of an IC, wherein the plurality of peripheral circuit blocks are coupled to a processor configured to execute program code and located on the IC. The method can include detecting, using the governor circuit, a selected known error state in a selected peripheral circuit block of the plurality of peripheral circuit blocks by comparing the operating state information with a list of known error states for the plurality of peripheral circuit blocks. The method further can include, performing, using the governor circuit, a corrective action by writing recovery state information to the selected peripheral circuit block in response to detecting the selected known error state.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 4 illustrates an example implementation of a task table for a governor circuit.

FIG. 6 illustrates another example method of operation for a governor circuit.

DETAILED DESCRIPTION

Figure 1:
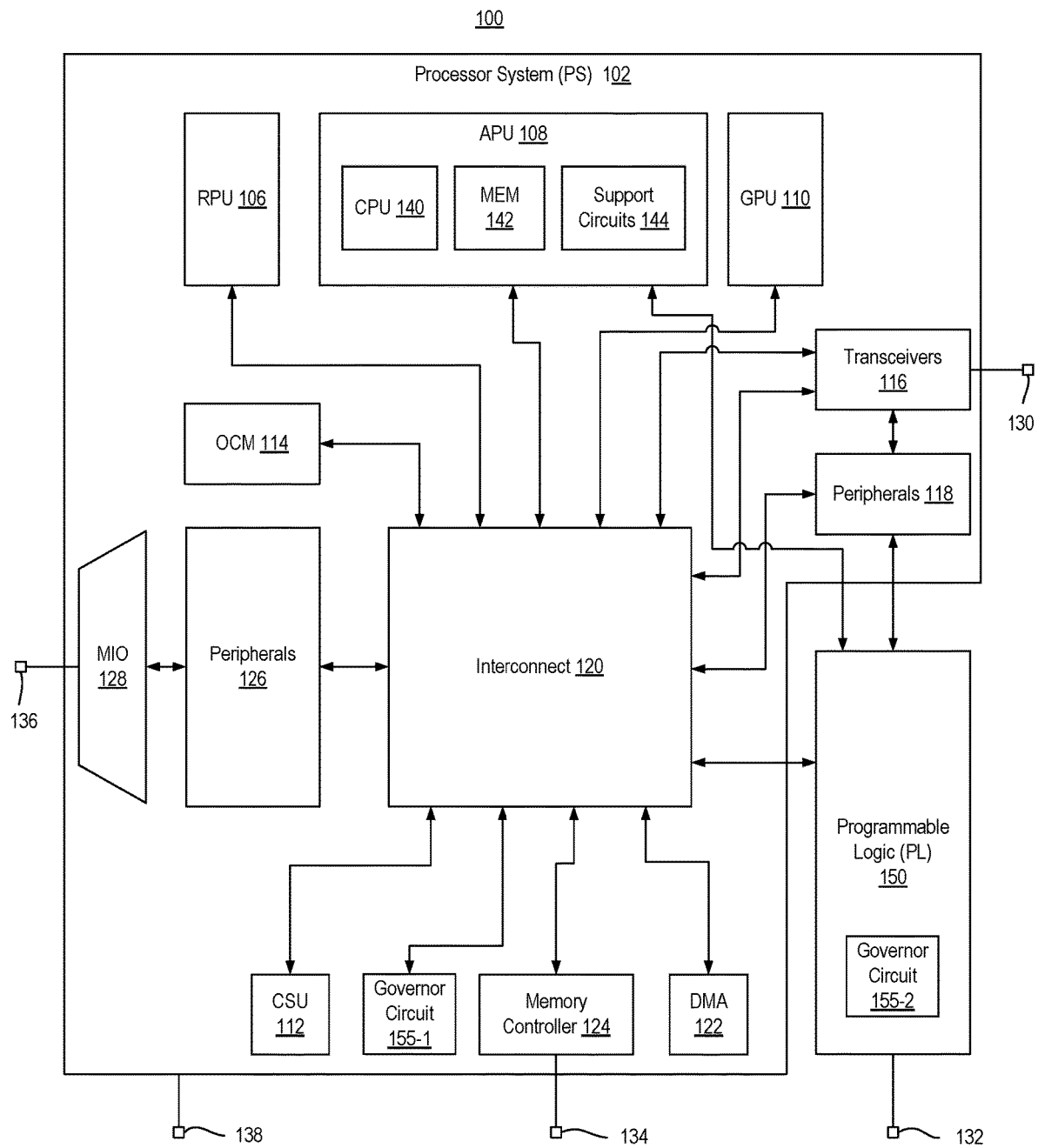
FIG. 1 illustrates an example of a System-on-Chip (SoC) type of integrated circuit (IC).

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to a circuit implemented on an IC that is capable of monitoring and recovering other circuit resources of the IC. A "System-on-Chip" or "SoC" is a type of IC. An SoC typically includes a processor that is capable of operating in a cooperative manner with one or more other circuit blocks and/or subsystems of the SoC. In many cases, one or more circuit blocks of the SoC operate as peripherals of the processor. These different peripheral circuit blocks may operate independently of one another or interact with one another. In the usual case, one or more of the peripheral circuit blocks are controlled by program code (e.g., software) executing on the processor.

From time-to-time, a peripheral circuit block of the SoC may enter a particular operating state that causes the processor of the SoC to hang. The operating state in the peripheral circuit block may be caused by any number of reasons. For example, the operating state in the peripheral circuit block may be caused by a bug or other defect in the SoC hardware and/or in the hardware of the peripheral circuit block itself, an uncovered or undefined condition in a protocol used by the peripheral circuit block, an incorrect configuration of the peripheral circuit block, or an attempt by the SoC to invoke a feature of the peripheral circuit block that is not supported.

In many SoCs, the failure of one peripheral circuit block results in system-wide (SoC-wide) failure. In such cases, the processor of the SoC hangs and is unable to perform any further operations or scheduled tasks. As used within this disclosure, the term "hang," "hanging," "hung," or other variations of hung or hang, as applied to a processor, means that the processor has become unresponsive. While in a hung state, the processor is unable to respond to instructions or commands or and is unable to perform tasks. As an example, the processor may be stuck in a loop. As such, while in the hung state, the processor is unable to recover the peripheral circuit block experiencing the failure or perform debugging functions. The failed peripheral circuit block remains in an irrecoverable state with the only option for recovery being resetting of the entire SoC. The SoC may not be recovered from this state automatically at runtime. An unrecoverable peripheral circuit block that causes the processor to become unresponsive means that, within the SoC, a single point of failure (e.g., the peripheral circuit block) is capable of bringing down the entire SoC.

In order to determine the cause of the failure, a system engineer must undertake an analysis of the system to determine the particular peripheral circuit block causing the problem and then understand the particular reason for the failure in the peripheral circuit block. This type of debugging can be time consuming. For example, the debugging may take days or weeks or longer in some cases. Given the many different peripheral circuit blocks and protocols used in modern, complex SoCs, it is unlikely that one single individual has the expertise necessary to perform the debugging that is necessary. This means that multiple people are needed for the task. Once the cause of the failure is determined, the system engineer(s) can develop a patch to modify the system.

In accordance with the inventive arrangements described within this disclosure, a governor circuit is provided that is capable of monitoring the operating states of peripheral circuit blocks of the SoC. The governor circuit is capable of monitoring the operating states of the peripheral circuit blocks for selected operating states that have been determined, e.g., via prior debugging efforts, to be known error states for the respective peripheral circuit blocks. The governor circuit is capable of storing state information obtained from the peripheral circuit blocks and/or performing debugging operations relating to the peripheral circuit blocks. In addition, the governor circuit is capable of initiating corrective action to recover one or more of the peripheral circuit blocks from any of the detected error states that may exist.

By recovering a peripheral circuit block from a known error state, the governor circuit is capable of recovering the entire SoC. That is, by alleviating the failure in the peripheral circuit block and returning the peripheral circuit block to a known good operating state, the processor is able to recover to a functional or responsive operating state, e.g., is no longer in a hung state. For example, with the peripheral circuit block no longer generating continuous error messages to the processor, the processor may exit an error handling routine or loop in which the processor was previously stuck. Accordingly, the governor circuit is capable of recovering the peripheral circuit blocks and, by extension, the entire SoC without the need to reset the entire SoC. In this manner, the governor circuit is capable of addressing a single point of failure that would otherwise bring down the entire SoC.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of an SoC 100 type of IC. In the example of FIG. 1, SoC 100 is implemented on a single die provided within a single package. In other examples, SoC 100 may be implemented using a plurality of interconnected dies within a single package where the various resources of SoC 100 (e.g., circuits) illustrated in FIG. 1 are implemented across the different interconnected dies. SoC 100 may include one or more different types of subsystems.

In the example, SoC 100 includes a processor system (PS) 102. While described as a "system," PS 102 is an example of a subsystem of SoC 100. In general, PS 102 is implemented as hardwired circuitry that is fabricated as part of SoC 100. PS 102 may be implemented as, or include, any of a variety of different types of processors each capable of executing program code. The processors may have different architectures and/or use different instruction sets.

In the example, PS 102 includes processors such as a real-time processing unit (RPU) 106, an application processing unit (APU) 108, a graphics processing unit (GPU) 110, a configuration and security unit (CSU) 112, and the like. In the example, each of the processors is capable of executing program code.

PS 102 also includes various support circuits, such as on-chip memory (OCM) 114, transceivers 116, peripherals 118, an interconnect 120, a direct memory access (DMA) circuit 122, a memory controller 124, peripherals 126, and a multiplexed input/output (MIO) circuit 128. The processors and the support circuits are interconnected by interconnect 120.

Transceivers 116 may be coupled to external pins 130. Programmable logic (PL) 150, to be described herein in greater detail, may be coupled to external pins 132. Memory controller 124 may be coupled to external pins 134. MIO 128 may be coupled to external pins 136. PS 102 may be coupled to external pins 138. APU 108 can include a CPU 140, memory (shown as "MEM") 142, and support circuits 144.

In the example of FIG. 1, each of processors 106, 108, and 110 may include one or more central processing units (CPUs) and associated circuits, such as memories, interrupt controllers, DMA controllers, memory management units (MMUs), floating point units (FPUs), and the like. Interconnect 120 includes various switches, busses, communication links, and the like configured to interconnect processors 106, 108, 110 and to interconnect the other components in PS 102 to processors 106, 108, and 110.

OCM 114 includes one or more random access memory (RAM) modules, which can be distributed throughout PS 102. For example, OCM 114 can include battery backed RAM (BBRAM), tightly coupled memory (TCM), and the like. Memory controller 124 can include a dynamic random access memory (DRAM) interface for accessing external DRAM. Peripherals 118, 126 can include one or more components, e.g., peripheral circuit blocks, that provide an interface to PS 102. For example, peripherals 126 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose IO (GPIO) ports, serial advanced technology attachment (SATA) ports, PCIe ports, and the like. Peripherals 126 can be coupled to MIO 128. Peripherals 118 can be coupled to transceivers 116. Transceivers 116 can include serializer/deserializer (SERDES) circuits, MGTs, and the like.

In the example of FIG. 1, SoC 100 optionally includes a PL 150 subsystem. PL 150 is circuitry that may be programmed to perform specified functions. As an example, PL 150 may be implemented as field programmable gate array type of circuitry. PL 150 can include an array of programmable circuit blocks. As defined herein, the term "programmable logic" means circuitry used to build reconfigurable digital circuits. Programmable logic is formed of many programmable circuit blocks that provide basic functionality.

In the example of FIG. 1, PL 150 may be coupled to interconnect 120. The topology of PL 150 is highly configurable unlike hardwired circuitry. Each programmable circuit block of PL 150 typically includes a programmable element (e.g., a functional element) and a programmable interconnect. The programmable interconnects provide the highly configurable topology of PL 150. The programmable interconnects may be configured on a per wire basis to provide connectivity among the programmable elements of programmable circuit blocks of PL 150 and is configurable on a per-bit basis (e.g., where each wire conveys a single bit of information) unlike packet-based communications, for example.

Examples of programmable circuit blocks of PL 150 include configurable logic blocks having look-up tables and registers. Unlike hardwired circuitry, these programmable circuit blocks have an undefined function at the time of manufacture. PL 150 may include other types of programmable circuit blocks that also provide basic and defined functionality with more limited programmability. Examples of these circuit blocks may include digital signal processing blocks (DSPs), phase lock loops (PLLs), and block random access memories (BRAMs). These types of programmable circuit blocks, like others in PL 150, are numerous and intermingled with the other programmable circuit blocks of PL 150. These circuit blocks may also have an architecture that generally includes a programmable interconnect and a programmable element and, as such, are part of the highly configurable topology of PL 150.

Prior to use, PL 150, e.g., the programmable interconnect and the programmable elements, must be programmed or "configured" by loading data referred to as a configuration bitstream into internal configuration memory cells therein. The configuration memory cells, once loaded with a configuration bitstream, define how PL 150 is configured, e.g., the topology, and operates (e.g., particular functions performed). Within this disclosure, a "configuration bitstream" is not equivalent to program code executable by a processor or computer.

SoC 100 may include one or more other subsystems including a processor array (e.g., a data processing engine (DPE) array), a Network-on-Chip (NoC), a platform management controller (PMC), and one or more hardwired circuit blocks. The term "hardwired" refers to circuitry that is fabricated as part of SoC 100 to perform a particular function. A hardwired circuit block refers to a special-purpose or application-specific circuit block fabricated as part of SoC 100. Though hardwired, hardwired circuit blocks may be configured by loading configuration data into control registers to implement one or more different modes of operation therein. Examples of hardwired circuit blocks may include input/output (I/O) blocks, transceivers for sending and receiving signals to circuits and/or systems external to SoC 100, memory controllers, or the like. Examples of different I/O blocks may include single-ended and pseudo differential I/Os. Examples of transceivers may include high-speed differentially clocked transceivers. Other examples of hardwired circuit blocks include, but are not limited to, cryptographic engines, digital-to-analog converters (DACs), analog-to-digital converters (ADCs), and the like.

SoC 100 further may include a governor circuit 155. The example of FIG. 1 illustrates two alternative implementations of governor circuit 155. The first implements governor circuit 155-1 as a hardwired circuit block within PS 102. In that case, governor circuit 155-1 may be coupled to interconnect 120. The second implements governor circuit 155-2 using PL 150. In still another example implementation not illustrated in FIG. 1, governor circuit 155 may be implemented as a hardwired circuit block outside of PS 102, e.g., elsewhere within SoC 100. It should be appreciated that the particular implementation of governor circuit 155 as a hardwired circuit block 155-1 or a circuit block 155-2 implemented using programmable logic may also depend upon the type of IC and/or SoC in which governor circuit 155 is implemented.

Despite the particular implementation of governor circuit 155, governor circuit 155 is capable of coupling to one or more peripheral circuit blocks (e.g., peripherals and/or peripheral devices) of SoC 100. Governor circuit 155 is capable of monitoring the operating states of such circuit peripheral circuit blocks and taking one or more predetermined actions in response to detecting known error states within the various peripheral circuit blocks.

Figure 2:
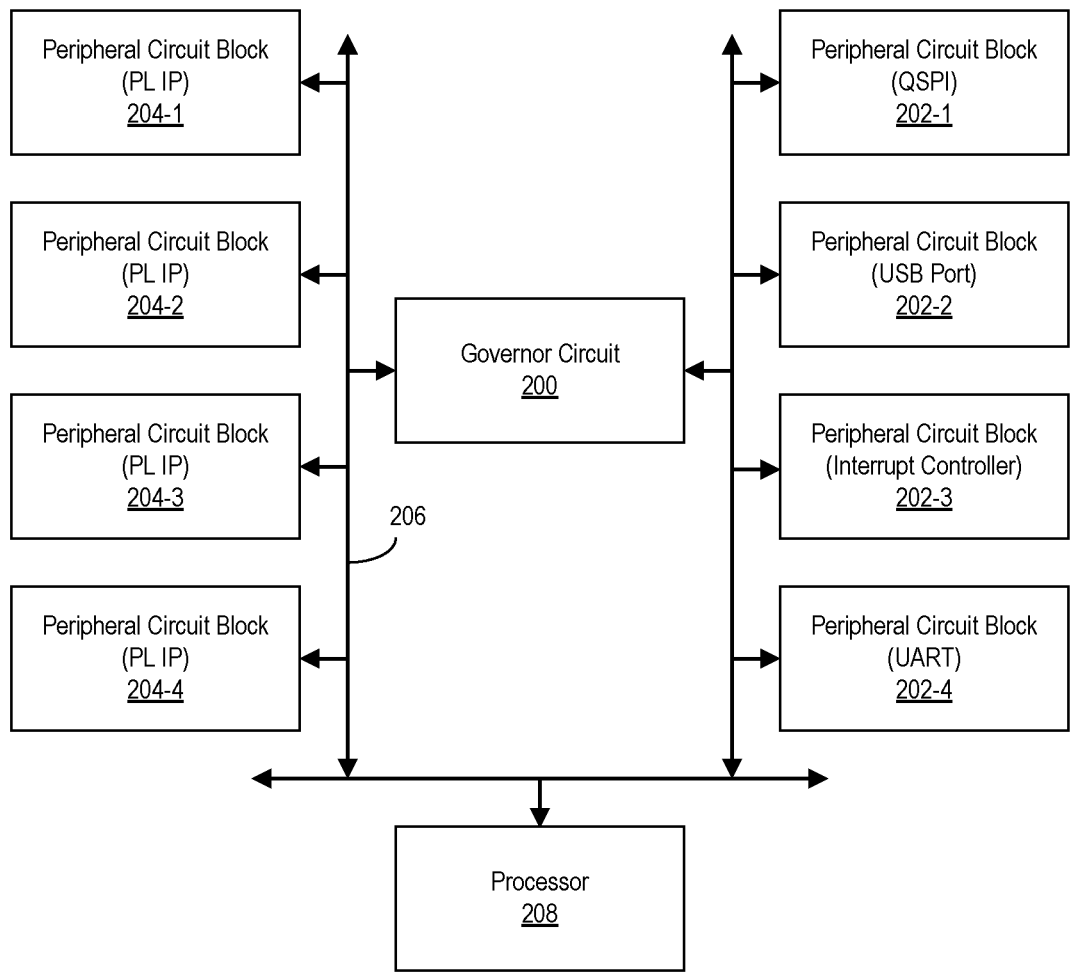
FIG. 2 illustrates an example implementation of a governor circuit coupled to a plurality of peripheral circuit blocks within an SoC.

FIG. 2 illustrates an example implementation of a governor circuit coupled to a plurality of peripheral circuit blocks within an SoC. The SoC may be the same as or similar to the SoC described in connection with FIG. 1. In the example of FIG. 2, governor circuit 200 is coupled to peripheral circuit blocks 202 (e.g., 202-1, 202-2, 202-3, and 202-4) and peripheral circuit blocks 204 (204-1, 204-2, 204-3, and 204-4). Peripheral circuit blocks 202 and 204 may operate as slave devices.

In the example of FIG. 2, peripheral circuit blocks 202 represent hardwired circuit blocks. For example, peripheral circuit blocks 202 may be implemented within a PS such as PS 102 (e.g., represented as peripherals 118 and/or peripherals 126 of FIG. 1). In another example, peripheral circuit blocks 202 may be implemented external to the PS, e.g., elsewhere within the SoC. In still another example, peripheral circuit blocks may be implemented both internal and external to the PS (e.g., wherein one or more of peripheral circuit blocks 202 are implemented within the PS and one or more other ones of peripheral circuit blocks 202 are implemented outside of the PS elsewhere in the SoC).

For purposes of illustration, peripheral circuit block 202-1 may be a quad serial peripheral interface (QSPI); peripheral circuit block 202-2 maybe a USB port or controller; peripheral circuit block 202-3 may be an interrupt controller; and peripheral circuit block 202-4 may be a UART. The particular types of peripheral circuit blocks shown in FIG. 2 are for purposes of illustration and not limitation. Peripheral circuit blocks 202 may be types other than those illustrated in FIG. 2 including, but not limited to, any of the example peripherals and/or hardwired circuit blocks (e.g., memory controllers) described in connection with FIG. 1.

Peripheral circuit blocks 204 represent circuit blocks implemented in programmable logic (e.g., PL 150). Peripheral circuit blocks 204 may be implemented as Intellectual Properties (IPs). In one aspect, an IP (e.g., a "core"), in the context of circuit design and/or programmable logic, means a pre-designed and reusable unit of logic, cell, or chip layout design in the field of electronic circuit design. An IP is expressed as a data structure specifying a description of hardware that performs a particular function. An IP may be expressed using hardware description language file(s), as a netlist, as a bitstream that programs programmable logic, or the like. The IPs may be user-specified or user-created.

Each of peripheral circuit blocks 202 and 204 can include a set of control registers used to control operation of the respective peripheral circuit block. The control registers may also store status information (e.g., operating state information) for each respective peripheral circuit block. The control registers, for example, store current operating state information of the peripheral circuit block at any given time. Any master circuit in the SoC is capable of reading these control registers and/or writing to the control registers.

Governor circuit 200 couples to peripheral circuit blocks 202 and 204 via a bus 206. Processor 208 also couples to peripheral circuit blocks 202 and 204 via bus 206. In the example of FIG. 2, both governor circuit 200 and processor 208 couple to peripheral circuit blocks 202 and 204 via the same bus. In other example implementations, governor circuit 200 may connect to peripheral circuit blocks 202 and 204 through a bus that is different from the bus used by processor 208 to couple to peripheral circuit blocks 202 and 204.

An example of a bus is the Advanced Microcontroller Bus Architecture (AMBA) eXtensible Interface (AXI) bus. An AMBA AXI bus is an embedded microcontroller bus interface for use in establishing on-chip connections between circuit blocks and/or systems. In one aspect, the bus may be a control bus. An example of a control bus is an AXI-Lite bus. It should be appreciated that AXI is provided as an example and is not intended as a limitation of the inventive arrangements described within this disclosure. Buses other than AXI and/or other connective circuits such as interconnects, cross-bars, or the like may be used.

Processor 208 may be implemented as any of a variety of processors capable of executing program code. For example, processor 208 may be implemented as any of the processors described in connection with FIG. 1. In the example, processor 208 is capable of executing a user application (e.g., program code). Processor 208, in executing the user application and being a master, is capable of accessing or using any of peripheral circuit blocks 202 and/or 204. In some cases, one or more of the peripheral circuit blocks 202, 204 enter an operating state that is known to cause issues in the SoC. For example, a peripheral circuit block may enter a known error state that results in processor 208 hanging.

In conventional ICs and/or SoCs that include a processor, the processor may be used for purposes of error recovery of the peripheral circuit block and/or debugging the detected errors. In cases where the processor is hung (e.g., non-responsive), attempts to initiate processes such as error recovery, data logging, and/or debugging are unsuccessful since the processor is effectively unavailable. In such cases, the entire IC/SoC must be reset.

In accordance with the inventive arrangements described within this disclosure, governor circuit 200 is also capable of operating as a master. As such, governor circuit 200 is capable of reading and/or writing to control registers of peripheral circuit blocks 202 and 204. By reading the control registers, governor circuit 200 is capable of detecting a known error state within one or more of peripheral circuit blocks 202, 204. In response to detecting the known error state based on operating state information read from the control registers, governor circuit 200 is capable of taking one or more predetermined actions relating to the peripheral circuit block(s) in which the known error state is detected. For example, governor circuit 200 is capable of implementing monitoring operations, recovery operations, and/or debugging operations.

It should be appreciated that the example implementations of governor circuit 200 described within this disclosure are operable with peripheral circuit blocks that are entirely hardwired circuit blocks, peripheral circuit blocks that are entirely implemented in programmable logic, or a combination of both. The particular example shown in FIG. 2 is not intended as a limitation.

Figure 3:
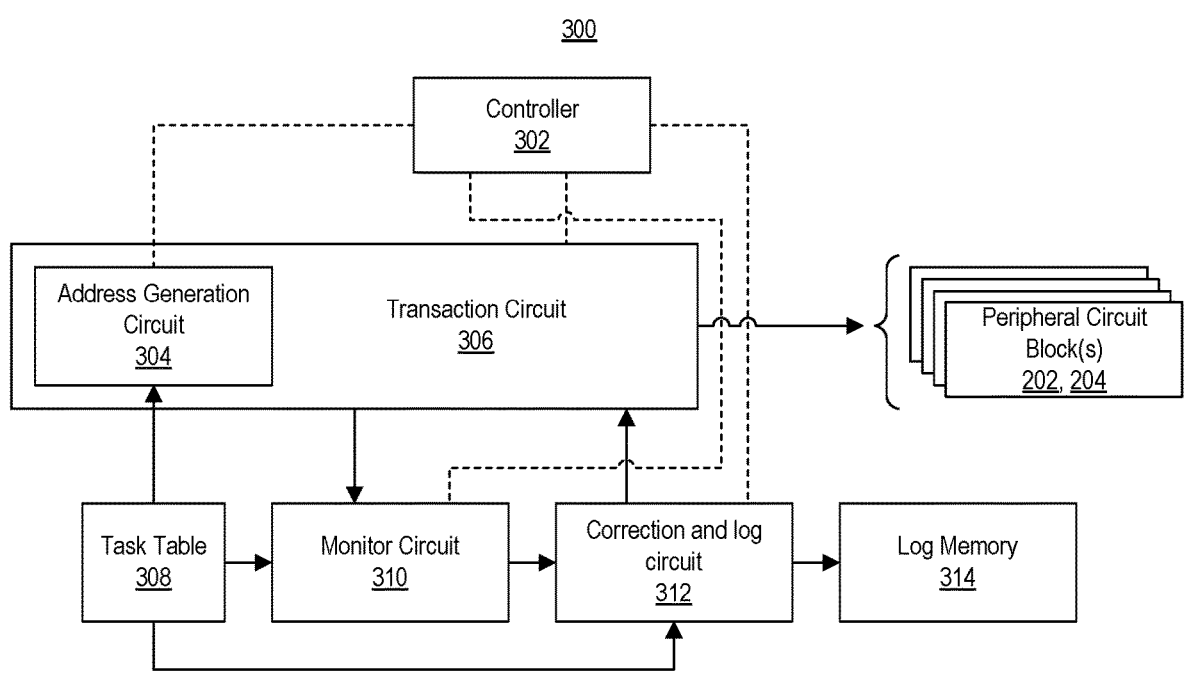
FIG. 3 illustrates an example architecture for implementing a governor circuit.

FIG. 3 illustrates an example architecture 300 for implementing a governor circuit. Architecture 300 may be used to implement a governor circuit as described within this disclosure. For example, governor circuit 300 may be used to implement governor circuits 155-1, 155-2, and/or 200. In the example, architecture 300 includes a controller 302, a transaction circuit 306, a task table 308, a monitor circuit 310, a correction and log circuit 312, and a log memory 314. In the example of FIG. 2, transaction circuit 306 includes an address generation circuit 304.

In one aspect, controller 302 is capable of implementing a finite state machine to control operation of the various circuit blocks illustrated in FIG. 3. In the example, control signals are illustrated with dashed lines while data signals are illustrated with solid lines. In general, the direction of control with respect to data flows is illustrated by the arrows. An arrow pointing in a particular direction does not necessarily imply one-way communication. Two blocks joined by an arrow may implement two-way communication. Further, it should be appreciated that the circuit blocks illustrated in FIG. 3 may communicate with controller 302 and that controller 302 is capable of initiating operations in the circuit blocks, detecting completion of such operations, and, in response to detecting completion of the operations, initiating further operations in other ones of the circuit blocks.

In the example of FIG. 3, address generation circuit 304 is capable of reading task table 308. Task table 308 may be implemented as a memory. Task table 308 is capable of specifying a list of the peripheral circuit blocks that are to be monitored, addresses (e.g., address offset) for the peripheral circuit blocks, addresses of particular control registers (or portions of control registers) to be read and/or monitored, operating state information indicating known error states (e.g., trigger values), addresses for control registers (or portions of control registers) to be written, and/or recovery state information to be written to the control registers. An example implementation of task table 308 is shown in greater detail in connection with FIG. 4.

Under control of controller 302, address generation circuit 304 is capable of indexing into task table 308 to determine an address for a control register of a peripheral circuit block that is to be monitored (e.g., read). For example, controller 302 is capable of causing address generation circuit 304 to read an address from task table 308.

Transaction circuit 306 is capable of generating read transactions for reading operating state information from control registers of peripheral circuit blocks 202, 204. Transaction circuit 306 is also capable of generating a write transactions for writing to control registers of peripheral circuit blocks 202, 204. The addresses used for the read and write transactions are determined by address generation circuit 304. Accordingly transaction circuit 306 is capable of reading operating state information from a control register of a selected peripheral circuit block.

Transaction circuit 306 is capable of providing operating state information read from the selected peripheral circuit block to monitor circuit 310. Monitor circuit 310 is capable of comparing the operating state information read from the selected peripheral circuit block with known error states for the selected peripheral circuit block specified in task table 308. In response to determining that the operating state information does not match any of the known error states for the selected peripheral circuit block, monitor circuit 310 takes no further action. In that case, governor circuit 200 may continue to monitor the operating state of one or more other peripheral circuit blocks. For example, the governor circuit is capable of iterating through task table 308 sequentially to read each of the control registers (or portions thereof) for the peripheral circuit blocks specified in task table 308.

In response to determining that the operating state information read from the selected peripheral circuit block matches a known error state for the selected peripheral circuit block, monitor circuit 310 is capable of indicating the match to controller 302. In one aspect, controller 302 is capable of generating a notification that a known error state was detected in the selected peripheral circuit block. In addition, controller 302 may also pass control to correction and log circuit 312.

Operating under control of controller 302, correction and log circuit 312 may take one or more different predetermined actions based on the actions specified in task table 308 for the detected known error state for the selected peripheral circuit block. These actions may include storing the detected known error state in log memory 314, obtaining debug information from one or more different locations within the SoC and storing such debug information in log memory 314, and/or storing the detected known error state in log memory 314 along with taking corrective action.

In an example implementation, correction and log circuit 312 is capable of taking corrective action by determining recovery state information from task table 308. Correction and log circuit 312 indexes into task table 308 to determine the appropriate recovery state information and an address of the control register to which the recovery state information is to be written given the detected known error state and the selected peripheral circuit block. Correction and log circuit 312 is capable of providing the recovery state information to transaction circuit 306. Address generation circuit 304 is capable of determining the address to be used to write the recover state information. Transaction circuit 306 is capable of generating a write transaction using the received address information and recovery state information. Transaction circuit 306 is capable of writing the recovery state information to the received address thereby recovering the selected peripheral circuit block from the known error state.

Once the selected peripheral circuit block is recovered from the known error state, the processor of the SoC also recovers from the hung state. In one aspect, controller 302 is capable of providing the notification that a known error state was detected in the selected peripheral circuit block to the processor once the processor recovers from the hung state. Log memory 314 may be implemented as a memory within the SoC. The processor, also being a master, is capable of reading log memory 314 to obtain any operating state information and/or debug information that may have been recorded relating to the detected known error state once the processor recovers from the non-responsive state.

The example architecture illustrated in FIG. 3 may be used to implement the governor circuit when implemented as a hardwired circuit block or when implemented using programmable logic. In another example implementation, a governor circuit may be implemented as a hardwired processor (e.g., another processor capable of executing program code) or as a processor implemented using programmable logic also referred to as a "soft processor."

The following are examples of known error states that may be determined by way of debugging an SoC and defined in the task table of a governor circuit. As such, a governor circuit as described within this disclosure is capable of detecting such error states in a peripheral circuit block and/or recovering the peripheral circuit block from the detected known error state. It should be appreciated that the particular actions performed in types of states that may be detected will vary based on the particular type of peripheral circuit block that is being monitored. These different known error states and any recovery state information may be stored within the task table.

Consider an SoC the same as or similar to that described in connection with FIG. 1. The processor may hang due to a peripheral circuit block failure. Analysis by system engineers of the failure may reveal that an interrupt controller in the SoC is generating such a large number of interrupts at startup such that the processor is perpetually stuck in an interrupt service routine or loop and unable to perform any other actions. The analysis may also reveal that these interrupts are spurious in that the interrupt controller is generating interrupts to the processor without cause. The interrupt controller may have a defect or bug and may be a third party IP. As such, the issue is not immediately correctable in the interrupt controller itself.

The governor circuit described herein is capable of detecting this condition by reading operating state information from the control register of the interrupt controller and detecting the known error state. The governor circuit may then write recovery state information to the control register of the interrupt controller to place the interrupt controller in a known good state that discontinues or stops spurious interrupt generation thereby recovering the peripheral circuit block from the error state. With the spurious interrupts discontinued, the processor is able to exit the interrupt service routine and resume normal operation (e.g., is no longer in a hung state).

In another example, a peripheral circuit block such as a USB controller in the SoC may enter an unknown state after startup of the SoC and in response to a USB device being removed from the USB port on the same board as the SoC. In this example, the governor circuit is capable of detecting the known error state by reading operating state information from the control register of the USB controller. The governor circuit may then write recovery state data to the control register of the USB controller to place the USB controller in a known good operating state thereby recovering the peripheral circuit block from the error state. The processor of the SoC may or may not be hung. In the case where the processor is in a hung state due to the USB controller being in an unrecoverable state, the processor recovers and becomes responsive in response to the USB controller recovering from the known error state.

FIG. 4 illustrates an example implementation of task table 308 of FIG. 3 for a governor circuit. Task table 308 specifies the name of each peripheral circuit block and the system offset of each peripheral circuit block to be monitored by the governor circuit. Task table 308 may also specify a list of all possible control registers (or portions thereof) that are to be monitored. The exact number of control registers to be monitored will depend on the complexity of the peripheral circuit blocks being monitored. In general, any inconsistency in the expected operating state information and the current operating state information that is read from the control register for a given peripheral circuit block may trigger a recovery mechanism in the governor circuit.

The governor circuit, for example, is capable of snooping the bus for the control register addresses specified in task table 308. In response to reading operating state information (e.g., current operating state information) from a control register of a selected peripheral circuit block that matches a known error state specified in task table 308, the governor circuit is capable of taking corrective action, storing the operating state information and/or debug information in the log memory, and/or informing the user. The corrective action may include modifying the contents (e.g., value) stored in the control register of the selected peripheral circuit block. The corrective action may also require a mask for ease of implementation. The mask may be programmed by the user.

In the example, task table 308 includes the following columns: "Peripheral Circuit Block," "Task," "Address Offset," "Control Register(s) to Monitor," "Known Error State (Trigger Value)," "Control Register(s) to Modify for Recovery," "Recovery State Information," and "Mask."

The "Peripheral Circuit Block" column lists the names of the peripheral circuit blocks in the SoC that are to be monitored by the governor circuit. The "Task" column indicates the type of operations to be performed. In general, the "G" stands for a governing task and indicates that the operation includes recovering the peripheral circuit block from the known error state. In the case of a "G" task, the row for the peripheral circuit block will include data for the "Control Register(s) to Modify for Recovery" and "Recovery State Information" columns and optionally for the "Mask" column.

A "G" task may include logging the peripheral circuit block for which a known error state is detected and the known error state that was detected. In one aspect, the governor circuit stores the information in the log memory. In another aspect, the governor circuit stores the information in a different memory such as a secondary memory that is external to the SoC and/or the circuit board on which the SoC is disposed (e.g., a memory in a host computer system) so that the data may be preserved should the SoC and/or the circuit board be powered off. The governor circuit, for example, is capable of storing the data in coordination with software (e.g., a driver and/or application) executed by the host computer system. It should be appreciated that the governor circuit is capable of storing the information in one or more memories (e.g., a local memory of the SoC such as the log memory and/or a secondary memory).

In the case of a "G" task, the governor circuit further take corrective action by writing recovery state information from the "Recovery State Information" column to particular control register(s) of the peripheral circuit block in which the known error state was detected as specified in the "Control Register(s) to Modify for Recovery" column. A mask as may be specified in the "Mask" column may be used to write the recovery state information.

The "M" stands for a monitoring task. In the case of an "M" task, the governor circuit does not take any corrective action. Accordingly, in the case of an "M" task, the row for the peripheral circuit block will not include data for the "Control Register(s) to Modify for Recovery," "Recovery State Information," or "Mask" columns. A monitor operation may include logging the peripheral circuit block for which a known error state is detected and the known error state that was detected. The governor circuit is capable of storing the information in a local memory of the SoC such as the log memory and/or a secondary memory as described.

The "D" stands for a debug task. In the case of a "D" task, the governor circuit does not take any corrective action. Accordingly, in the case of a "D" task, the row for the peripheral circuit block will not include data for the "Control Register(s) to Modify for Recovery," "Recovery State Information," or "Mask" columns. A debug operation may include storing the peripheral circuit block for which a known error state is detected and the known error state that was detected in addition to other data collectively referred to as debug information. The governor circuit is capable of storing the debug information in a local memory of the SoC such as the log memory and/or a secondary memory as described.

In an example illustration, in the case of a "D" task, the governor circuit is capable of checking for the error condition. In response to detecting the error condition (e.g., the governor circuit determining that the error condition is met), the governor circuit is capable of logging the register values specified in the "Control Register(s) to Monitor" column.

In another aspect, the debug information may include actual transactions or messages exchanged between the peripheral circuit block in which the known error state is detected and/or other peripheral circuit blocks and the processor for some specified period of time or storing a particular number of such transactions or messages.

In an example implementation, the governor circuit may be pre-configured to store the last "N" transactions exchanged between the peripheral circuit block and the processor, where N is an integer value of 1 or more. For example, a default configuration of the governor circuit may be to store the last 100 transactions exchanged over the bus between the peripheral circuit block in which the known error state is detected and the processor. In another example, the governor circuit may be configured to store the last N transactions exchanged on the bus without regard to the particular peripheral circuit block involved. In such an implementation, for example, the governor circuit may capture transactions between the processor and the particular peripheral circuit block in which the known error state was detected, between the processor and one or more other peripheral circuit blocks, or both. This type of data can be useful in debugging the system particularly in the case of a system (e.g., processor) hang as described herein. As noted, the debug data may be stored in the log memory (e.g., a local memory of the SoC) and/or in a secondary memory.

The "Address Offset" column indicates the address offset, given a base address, of each of the peripheral circuit blocks. The "Control Register(s) to Monitor" column indicates the particular location or address of the control register (or portion thereof) of each peripheral circuit block that is to be monitored. The "Known Error State" column indicates the particular operating state data, e.g., trigger value, that, when detected, indicatives a known error state in the peripheral circuit block of the same row. The operating state data read from the control registers of the peripheral circuit blocks is compared to the data in this column for each respective peripheral circuit block by the monitor circuit.

In the example of FIG. 4, referring to the "Known Error State" column, the term "RD Value" or "Read Value" represents the value that the governor circuit reads from the control register(s) of the peripheral circuit block. The known error states may be specified as values or as expressions (e.g., logical and/or relational expressions). The governor circuit is capable of evaluating an expression specified in the "Known Error State" column to determine the particular value or values to detect for a given peripheral circuit block. In the case of an expression, the governor circuit detects a known error state in response to determining that a result determined by computing the expression in the "Known Error State" column is true. Referring to the example of FIG. 4, "RD value &" and "RD Value>EXPECTED" are example expressions that may be used to specify QoS error states. It should be appreciated that for different types of errors (e.g., known error states) and/or different peripheral circuit blocks, the values and/or expressions will differ.

The "Control Register(s) to Modify for Recovery" indicates the address of the control register (or portion thereof) that is to be modified, e.g., written with recovery state information, to recover the peripheral circuit block from the known error state. It should be appreciated that the address to be written may be the same as or different from the address of the control register listed in the "Control Register(s) to Monitor" column. The "Recovery State Information" lists the recovery state information (e.g., values) to be written to the address listed in the "Control Register(s) to Modify for Recovery" column for the peripheral circuit block. The "Mask" column specifies the mask to be used when writing the recovery state information if necessary.

Each of the different tasks may include logging or storing the data involved (e.g., the known error state and/or any further debug information as applicable) in the log memory and/or a secondary memory. Timestamp information may also be stored for detected known error states. Further, each of the different tasks may trigger a notification to the processor or other component of the SoC.

In another example implementation, the corrective action taken by the governor circuit may include modifying Quality of Service (QoS) settings in a peripheral circuit block. Referring again to FIG. 4, the row corresponding to "DDR QoS" may specify QoS settings that, if detected (e.g., the known error state), should be changed. The recovery state information may specify new and/or different QoS settings for the peripheral circuit block. Depending on the particular peripheral circuit block and configuration, the QoS settings may differ.

In an example implementation, the QoS settings specified in the "Recovery State Information" column for the DDR QoS may specify QoS settings that have been found to allow the memory controller to operate more efficiently when servicing multiple master circuits. The DDR controller, for example, may have been initially configured to service a single master circuit. As such, the governor circuit is capable of changing the QoS settings of particular peripheral circuit blocks to different QoS settings that have been found to work more efficiently or better for different scenarios of an application. At runtime, without human intervention or intervention by the application executed by the processor, the governor circuit is capable of configuring QoS settings of peripheral circuit blocks such as those for a DDR memory controller.

In another example implementation, use of expressions in the "Known Error State" column allows the governor circuit to monitor for a range or specified plurality of known error states (and/or QoS settings). As such, the governor circuit can monitor changing states and/or QoS settings in a more dynamic way over time as the peripheral circuit block(s) continue to operate. This allows the governor circuit to detect a range or plurality of known error states or incorrect QoS settings for a given peripheral circuit block and also determine (e.g., taken no action) for a range or plurality of correct states and/or QoS settings for the peripheral circuit block.

In still another example, task table 308 may be updated periodically or from time-to-time. A privileged user (e.g., human being or entity), for example, one with administrative and/or root login type of rights, may be given the ability to update task table 308 at runtime of the governor circuit (e.g., during operation of the SoC after startup and/or boot). In an example implementation, the privileged user may update task table 308 in response to particular conditions or events that are detected in the SoC itself and/or conditions or events that are external to the SoC. The host computer system, executing suitable operational software and/or drivers, is an example of such a user.

Figure 5:
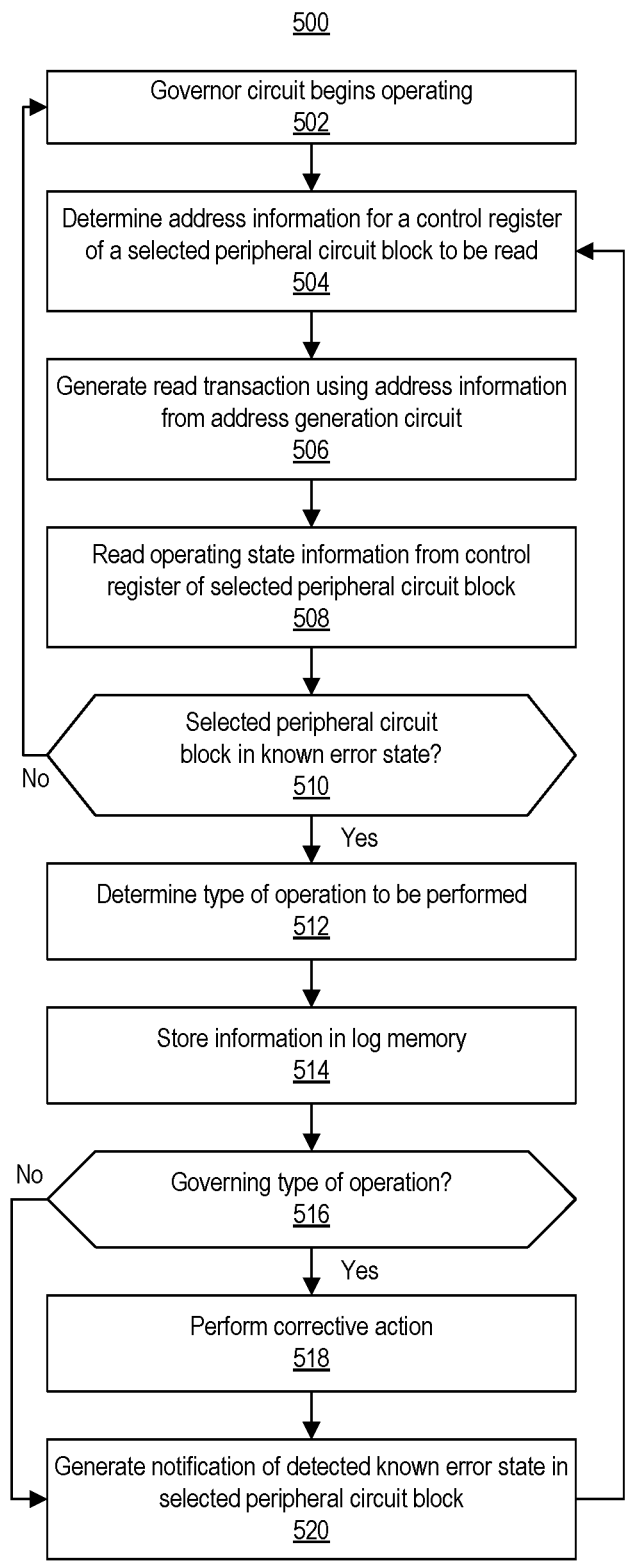
FIG. 5 illustrates an example method of operation for a governor circuit.

FIG. 5 illustrates an example method 500 of operation for a governor circuit. A governor circuit as described in connection with FIGS. 1-4, for example, is capable of performing the operations described in connection with FIG. 5.

In block 502, the governor circuit begins operating. For example, upon start up or reset of the SoC, the governor circuit begins operating to monitor the operating state of one or more peripheral circuit blocks as specified in the task table.

In block 504, the governor circuit is capable of determining address information for a control register of a selected peripheral circuit block to be read. For example, the address generation circuit is capable of indexing into a row of the task table for a selected peripheral circuit block to determine the address offset for the selected peripheral circuit block and an address of a control register of the peripheral circuit block to read. Upon each iteration of block 504, for instance, the address generation circuit is capable of selecting a next control register to read for the selected peripheral circuit block or a next control register to read for a next peripheral circuit block in the task table. In this manner, the address generation circuit is capable of iterating through the list of peripheral circuit blocks and control registers to ensure that each such control register is read. As noted, the address generation circuit may operate under control of the controller.

In block 506, the governor circuit is capable of generating a read transaction using the address information determined by the address generation circuit. For example, the transaction circuit is capable of generating the read transaction. In block 508, the governor circuit, e.g., using the transaction circuit, is capable of reading the operating state information from the control register of the selected peripheral circuit block as specified by the address information.

In block 510, the governor circuit is capable of determining whether the selected peripheral circuit block is in a known error state based on the operating state information read from the control register. For example, the transaction circuit is capable of providing the operating state information read from the control register to the monitor circuit. The monitor circuit is capable of comparing the operating state information read from the control register with the known error state(s) for the particular control register address that was read as specified in the task table. In response to determining that the operating state information matches the known error state, the monitor circuit determines that the selected peripheral circuit block is in a known error state. In that case, method 500 continues to block 512. In response to determining that the operating state information does not match the known error state(s) specified in the task table, the governor circuit does not take any further action with respect to the selected peripheral circuit block. In that case, method 500 loops back to block 504 to read operating state information for another or next control register of the selected peripheral circuit block or for another control register of a different or next peripheral circuit block based on the task table.

In block 512, the governor circuit is capable of determining the particular type of operation to be performed. For example, the correction and log circuit is capable of accessing the task table to determine the type of operation to be performed for the detected known error state in the selected peripheral circuit block. Example types of operations include, but are not limited to, governing (G), monitoring (M), and debug (D).

In block 514, the governor circuit is capable of storing information relating to the detected known error state in the log memory. For example, in the case of a monitoring type of operation and in the case of a governing type of operation, the correction and log circuit is capable of storing information such as the particular peripheral circuit block that experienced the known error state, the detected known error state, and optionally timing information (e.g., a timestamp indicating when the known error state was detected). In the case of a debug type of operation, the correction and log circuit is capable of storing information such as the particular peripheral circuit block that experienced the known error state, the detected known error state, any other debug information collected or obtained from specified locations in the SoC, and optionally timing information (e.g., a timestamp or timestamps).

In block 516, the governor circuit is capable of determining whether the type of operation to be performed is a governing type of operation. For example, in response to the correction and log circuit determining that the type of operation to be performed is a governing type of operation, method 500 continues to block 518. In block 518, the governor circuit is capable of performing corrective action specified in the task table. For example, the correction and log circuit is capable of determining the recovery state information to be written and the mask to be used to write the recovery state information if a mask is specified. The address generation circuit is capable of determining the address information for the control register of the selected peripheral circuit block to which the recovery state information is to be written. The transaction circuit is capable of generating a write transaction using the information determined by the address generation circuit and the correction and log circuit to write the recovery state information to the intended control register or portion thereof of the selected peripheral circuit block.

In response to determining that the type of operation is not governing in block 516 or subsequent to block 518, method 500 continues to block 520. Accordingly, in block 520, the governor circuit is capable of generating a notification of the detected known error state in the selected peripheral circuit block. In one aspect, the controller is capable of providing a notification to one or more different destinations in the SoC. For example, the controller is capable of providing the notification to the processor once the processor is no longer in a hung state. In another example, the controller is capable of providing the notification to an external pin of the SoC that may be monitored by another system on behalf of a user (e.g., a human being). In other examples, the controller is capable of generating a notification immediately in response to detecting the known error state.

After block 520, method 500 can loop back to block 504 to continue processing to monitor further control registers and further peripheral circuit blocks. Method 500 can continue to iterate while the SoC continues to operate. While method 500 is described sequentially, it should be appreciated that the various blocks of the governor circuit are capable of operating independently and concurrently.

The example governor circuit implementations described within this disclosure provide the SoC with the ability to monitor and correct behavior of the SoC during runtime, or operation. This ability is maintained despite the processor of the system being in a hung or non-responsive state, thereby making the SoC more robust and less prone to failure. The governor circuit further provides reconfigurability at least by virtue of the task table thereby allowing the governor circuit to be adapted to any of a variety of systems with different types of peripheral circuit blocks. Implementation of the governor circuit in programmable logic means that the governor circuit may be implemented in existing SoCs in the field and/or in future designs.

FIG. 6 illustrates another example method 600 of operation for a governor circuit. Method 600 may be performed by a governor circuit as described within this disclosure in connection with FIGS. 1-5.

In block 602, the governor circuit is capable of reading current operating state information for a plurality of peripheral circuit blocks of an integrated circuit. The integrated circuit may be an SoC type of device. The plurality of peripheral circuit blocks are coupled to a processor within the IC that is capable of executing program code.

In block 604, the governor circuit is capable of detecting a selected known error state in a selected peripheral circuit block of the plurality of peripheral circuit blocks. For example, the governor circuit is capable of comparing the operating state information with a list of known error states for the plurality of peripheral circuit blocks.

In block 606, the governor circuit is capable of performing a corrective action by writing recovery state information to the selected peripheral circuit block in response to detecting the selected known error state.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The terms first, second, etc. may be used herein to describe various elements. These elements should not be limited by these terms, as these terms are only used to distinguish one element from another unless stated otherwise or the context clearly indicates otherwise.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems and methods according to various aspects of the inventive arrangements. In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one aspect, an integrated circuit can include a processor configured to execute program code and a plurality of peripheral circuit blocks coupled to the processor. The plurality of peripheral circuit blocks are controlled by the processor as a master. The integrated circuit also can include a governor circuit coupled to the plurality of peripheral circuit blocks. The governor circuit is configured to monitor operation of the plurality of peripheral circuit blocks for known error states and, in response to detecting an occurrence of a selected known error state of the known error states in a selected peripheral circuit block of the plurality of peripheral circuit blocks, perform a predetermined action on the selected peripheral circuit block.

The foregoing and other implementations can each optionally include one or more of the following features, alone or in combination. Some example implementations include all the following features in combination.

In another aspect, the governor circuit is configured to monitor operation of the plurality of peripheral circuit blocks by reading control registers of the plurality of peripheral circuit blocks.

In another aspect, the predetermined action includes storing the selected known error state of the selected peripheral circuit block in a log memory of the governor circuit.

In another aspect, the predetermined action includes storing transactions exchanged between the selected peripheral circuit block and the processor in the log memory.

In another aspect, action includes recovering the selected peripheral circuit block from the selected known error state.

In another aspect, the selected known error state is a failure condition in the selected peripheral circuit block that causes a hang condition in the processor.

In another aspect, recovering the selected peripheral circuit block includes writing recovery state information to a control register of the selected peripheral circuit block.

In another aspect, the predetermined action includes modifying a quality of service setting of the selected peripheral circuit block.

In another aspect, a governor circuit implemented within an integrated circuit can include a task table defining a plurality of peripheral circuit blocks of the integrated circuit, known error states for the plurality of peripheral circuit blocks, and corrective actions to be performed in response to detecting one or more of the known error states. The governor circuit can include a transaction circuit configured to read operating state information of the plurality of peripheral circuit blocks and write recovery state information to the plurality of peripheral circuit blocks. The governor circuit can include a monitor circuit and a correction and log circuit. The monitor circuit can be configured to detect the known error states in the plurality of peripheral circuit blocks based on the operating state information. The correction and log circuit can be configured to determine, using the task table, corrective actions to be performed responsive to detection of the known error states. The governor circuit also can include a controller configured to control operation of the transaction circuit, the monitor circuit, and the correction and log circuit. The transaction circuit can be configured to perform a selected corrective action by writing to a selected peripheral circuit block of the plurality of peripheral circuit blocks in response to detecting a selected known error state in the selected peripheral circuit block.

The foregoing and other implementations can each optionally include one or more of the following features, alone or in combination. Some example implementations include all the following features in combination.

In another aspect, the governor circuit includes an address generation circuit. The address generation circuit is configured to generate, based on the task table, addresses for the transaction circuit to perform reads and writes of the plurality of peripheral circuit blocks.

In another aspect, the governor circuit includes a log memory coupled to the correction and logic circuit, wherein the log memory is configured to store state information for the plurality of peripheral circuit blocks.

In another aspect, the transaction circuit is configured to read the operating state information from control registers of the plurality of peripheral circuit blocks. The monitor circuit is configured to determine whether the operating state information matches the known error states of the task table for respective ones of the plurality of peripheral circuit blocks.

In another aspect, the selected corrective action includes recovering the selected peripheral circuit block by writing recovery state information to a control register of the selected peripheral circuit block.

In another aspect, the selected corrective action includes modifying a quality of service setting of the selected peripheral circuit block.

In another aspect, the selected known error state is a failure condition in the selected peripheral circuit block that causes a hang condition in a processor also coupled to the plurality of peripheral circuit blocks.

In another aspect, the governor circuit is a master to the plurality of peripheral circuit blocks.

In another aspect, a method includes reading, using a governor circuit, operating state information for a plurality of peripheral circuit blocks of an integrated circuit, wherein the plurality of peripheral circuit blocks are coupled to a processor configured to execute program code and located on the integrated circuit. The method can include detecting, using the governor circuit, a selected known error state in a selected peripheral circuit block of the plurality of peripheral circuit blocks by comparing the operating state information with a list of known error states for the plurality of peripheral circuit blocks. The method further can include, performing, using the governor circuit, a corrective action by writing recovery state information to the selected peripheral circuit block in response to detecting the selected known error state.

The foregoing and other implementations can each optionally include one or more of the following features, alone or in combination. Some example implementations include all the following features in combination.

In another aspect, the recovery state information specifies a modified quality of service setting for the selected peripheral circuit block.

In another aspect, the selected known error state is a failure condition in the selected peripheral circuit block that causes a hang condition in the processor.

In another aspect, the governor circuit is a master to the plurality of peripheral circuit blocks.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. An integrated circuit, comprising:
   a processor configured to execute program code;
   a plurality of peripheral circuit blocks coupled to the processor, wherein the plurality of peripheral circuit blocks are controlled by the processor as a master;
   a governor circuit coupled to the plurality of peripheral circuit blocks, wherein the governor circuit includes a task table listing the plurality of peripheral circuit blocks, control registers of the plurality of peripheral circuit blocks, operating state information corresponding to known error states for the plurality of peripheral circuit blocks wherein one or more of the known error states cause the processor to enter an unresponsive state, and corrective actions for the known error states;
   wherein the governor circuit is configured to monitor operation of the plurality of peripheral circuit blocks by iterating through the control registers of the task table to read operating state information from the control registers, wherein the governor circuit detects the known error states in the plurality of peripheral circuit blocks in response to matching the operating state information read from the control registers of the plurality of peripheral circuit blocks to the operating state information corresponding to the known error states in the task table corresponding to respective ones of the plurality of peripheral circuit blocks; and
   wherein, in response to the governor circuit detecting an occurrence of a selected known error state of the known error states in a selected peripheral circuit block of the plurality of peripheral circuit blocks, the governor circuit is configured to perform a predetermined action on the selected peripheral circuit block as determined from the corrective actions of the task table.

2. The integrated circuit of claim 1, wherein the governor circuit is programmable at runtime of the integrated circuit by updating contents of the task table.

3. The integrated circuit of claim 1, wherein the governor circuit reads the operating state information from the control registers of the plurality of peripheral circuit blocks by generating read transactions directed to the control registers using address information for the control registers obtained from the task table.

4. The integrated circuit of claim 3, wherein the predetermined action includes storing transactions exchanged between the selected peripheral circuit block and the processor in a log memory.

5. The integrated circuit of claim 1, wherein the predetermined action includes recovering the selected peripheral circuit block from the selected known error state.

6. The integrated circuit of claim 1, wherein the task table specifies a range of known error states for at least one of the plurality of peripheral circuit blocks.

7. The integrated circuit of claim 5, wherein the recovering the selected peripheral circuit block includes writing recovery state information to the control register of the selected peripheral circuit block.

8. The integrated circuit of claim 1, wherein the predetermined action includes modifying a quality of service setting of the selected peripheral circuit block.

9. A governor circuit implemented within an integrated circuit, wherein the governor circuit comprises:

a task table defining a plurality of peripheral circuit blocks of the integrated circuit, control registers of the plurality of peripheral circuit blocks, operating state information corresponding to known error states for the plurality of peripheral circuit blocks, and corrective actions for one or more of the known error states;

a transaction circuit configured to read operating state information from control registers of the plurality of peripheral circuit blocks and write recovery state information to the plurality of peripheral circuit blocks;

wherein the transaction circuit is configured iterate through the control registers of the task table to read operating state information from the control registers of respective ones of the plurality of peripheral circuit blocks;

a monitor circuit configured to detect the known error states in the plurality of peripheral circuit blocks by comparing the operating state information read from the plurality of peripheral circuit blocks with the operating state information corresponding to the known error states from the task table and determining a match from the comparing;

a correction and log circuit configured to determine, using the task table, corrective actions to be performed responsive to determining a match between the operating state information read from the plurality of peripheral circuit blocks and the operating state information corresponding to the known error states from the task table;

a controller configured to control operation of the transaction circuit, the monitor circuit, and the correction and log circuit; and wherein the transaction circuit is configured to perform a selected corrective action by writing to a selected peripheral circuit block of the plurality of peripheral circuit blocks in response to the monitor circuit detecting a selected known error state in the selected peripheral circuit block, wherein the selected corrective action is from the task table and corresponds to the selected known error state.

10. The governor circuit of claim 9, wherein the governor circuit includes:

an address generation circuit configured to generate, based on address information for the control registers in the task table, addresses for the transaction circuit to perform reads and writes of the plurality of peripheral circuit blocks.

11. The governor circuit of claim 9, further comprising:
a log memory coupled to the correction and logic circuit, wherein the log memory is configured to store state information for the plurality of peripheral circuit blocks.

12. The governor circuit of claim 9, wherein
the monitor circuit is configured to determine whether the operating state information matches the known error states of the task table for respective ones of the plurality of peripheral circuit blocks.

13. The governor circuit of claim 9, wherein the selected corrective action includes recovering the selected peripheral circuit block by writing recovery state information to a control register of the selected peripheral circuit block.

14. The governor circuit of claim 9, wherein the selected corrective action includes modifying a quality of service setting of the selected peripheral circuit block.

15. The governor circuit of claim 9, wherein the selected known error state is a failure condition in the selected peripheral circuit block that causes a processor also coupled to the plurality of peripheral circuit blocks to become unresponsive.

16. The governor circuit of claim 9, wherein the governor circuit is a master to the plurality of peripheral circuit blocks.

17. A method, comprising:
reading, using a governor circuit, operating state information for a plurality of peripheral circuit blocks of an integrated circuit from control registers of the plurality of peripheral circuit blocks, wherein the plurality of peripheral circuit blocks are coupled to a processor configured to execute program code and located on the integrated circuit;

detecting, using the governor circuit, a selected known error state in a selected peripheral circuit block of the plurality of peripheral circuit blocks by comparing the operating state information read from the control registers with operating state information corresponding to known error states for the plurality of peripheral circuit blocks stored in a task table of the governor circuit;

wherein the task table includes a list of the plurality of peripheral circuit blocks, control registers of the plurality of peripheral circuit blocks, operating state information corresponding to known error states for the plurality of peripheral circuit blocks wherein one or more of the known error states cause the processor to enter an unresponsive state, and corrective actions for the known error states;

determining recovery state information for the selected peripheral circuit block from the task table based on the selected known error state; and performing, using the governor circuit, a corrective action by writing the recovery state information to the control registers of the selected peripheral circuit block in response to detecting the selected known error state.

18. The method of claim 17, wherein the recovery state information specifies a modified quality of service setting for the selected peripheral circuit block.

19. The method of claim 17, wherein the selected known error state is a failure condition in the selected peripheral circuit block that causes the processor to become unresponsive.

20. The method of claim 17, wherein the governor circuit reads the operating state information from the control registers of the plurality of peripheral circuit blocks by generating read transactions to the control registers using address information for the control registers obtained from the task table.

\* \* \* \* \*